Figures 1, 2, 2A:
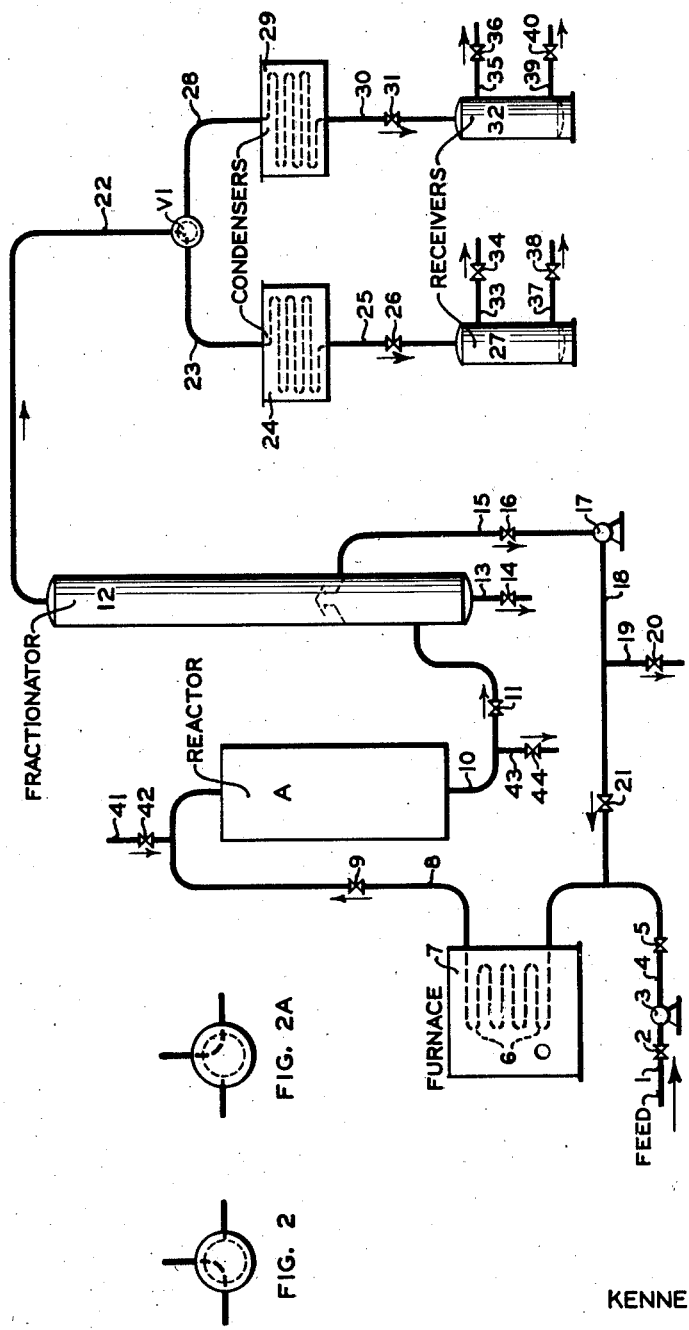

June 29, 1943.  K. M. WATSON  2,322,984

HYDROCARBON CONVERSION

Filed April 6, 1940

INVENTOR
KENNETH M. WATSON
BY Lee J. Gary
ATTORNEY

Patented June 29, 1943

2,322,984

UNITED STATES PATENT OFFICE 2,322,984

HYDROCARBON CONVERSION

Kenneth M. Watson, Chicago, Ill., assignor to Universal Oil Products Company, Chicago, Ill., a corporation of Delaware Application April 6, 1940, Serial No. 328,202

2 Claims. (Cl. 196—52)

This invention relates to a process for catalytically converting hydrocarbon oil to produce therefrom both substantially saturated gasoline and gasoline of an unsaturated character. More specifically, the invention is concerned with a new and useful process for conducting catalytic conversion reactions wherein during the early part of the processing period a substantially saturated gasoline may be obtained while during the later stages of the processing period the product becomes unsaturated.

In catalytic cracking processes employing any of the well known types of catalysts, quite generally the length of the processing period is adjusted in accordance with the sustained activity of the catalyst, and when the catalyst begins to lose its activity it is removed from the processing stage and subjected to reactivation while fresh or freshly regenerated catalyst is employed in processing. The length of the processing period will ordinarily vary depending upon the type of catalyst employed and their degrees of activity, and in the case of a more active catalyst the processing period will ordinarily be longer than in the case of a comparatively less active catalyst. In the majority of cases, the composition of the product obtained during the entire processing period while employing any of the well known catalysts will be substantially unsaturated in character usually, however, with a relatively high octane rating probably due to this unsaturated character.

Various methods have been devised for accomplishing catalytic cracking of hydrocarbon oil, the more common of which employs at least two reaction zones containing the desired catalyst, the reaction zones being alternately operated as the conversion zone, i. e., during the interval in which the reactants are supplied to one of the reaction zones the catalyst contained in the other reaction zone is undergoing reactivation so that the processing stage takes up substantially the same length of time as the reactivation stage.

The catalysts employed will ordinarily retain their activity for prolonged periods of time, such as, for example, from six months to a year, however, the deposition of carbonaceous substances during the processing period will reduce the active surface of the catalyst particles to such an extent that a temporary loss in activity will result. In such cases, the activity of the catalyst may be restored by removing therefrom the carbonaceous substances deposited as above mentioned. This is ordinarily accomplished by passing a non-oxidizing gas, such as combustion gases, containing controlled minor amounts of oxygen in contact with the catalyst to be reactivated at a temperature sufficient to initiate combustion and removing the heat formed during the combustion reaction either as sensible heat in the reactivating gases or by some form of external cooling. Catalysts reactivated in this manner will usually possess a high degree of activity substantially the same as that of the catalyst when it was freshly made. A permanent reduction in the activity of the catalyst after reactivation becomes apparent only after long continued use probably resulting from physical changes taking place within the catalyst particle and, in such cases, this catalyst may be disposed of and replaced with freshly prepared catalyst.

It has been found that the gasoline produced during the early part of the processing period when employing either a freshly prepared or freshly regenerated catalyst is substantially saturated in character and of high octane rating making it useful as an aviation gasoline to be used alone or for blending purposes. The interval during which a substantially saturated gasoline is produced will depend to a large extent upon the activity of the catalyst employed (activities being entirely comparative and corresponding to the per cent of gas plus gasoline produced when treating a Pennsylvania straight run gas-oil). It has also been found that during the early part of the processing period while the substantially saturated gasoline is produced the rate of conversion to gasoline is comparatively higher than in the later stages of the processing. This is probably best explained by the fact that the deposition of carbonaceous substances during the early part of the processing when the catalyst has a high initial activity is the greatest, while in the later stages of the processing the rate at which carbonaceous substances deposit decreases and although the rate of conversion is lower it proceeds at a more uniform rate until the deposition becomes so great that the activity of the catalyst is materially impaired.

In view of the above, the invention provides for withdrawing conversion products from the reaction zone to a fractionating system of relatively low holdup, such as, for example, a packed column, and for withdrawing fractionated vapors during the early stage of the processing period to condensing and collecting equipment separate from that to which the fractionated vapors separated in the later stages of the processing period are supplied, whereby to separately recover the substantially saturated gasoline and the unsaturated gasoline.

In one specific embodiment the invention comprises heating hydrocarbon reactants to the desired conversion temperature, passing the heated reactants in contact with catalytic material capable of promoting the desired reaction, fractionating the conversion products from the reaction zone and separately recovering the fractionated vapors separated during the early stage of the processing period and the fractionated vapors separated during the later stage of the processing period.

The accompanying drawing illustrates in conventional side elevation one specific form of the apparatus which may be employed to accomplish the objects of the invention. Figure 1 is an illustration of the process employing two condensers and two receivers for separately condensing and collecting the fractionated vapors, while Figures 2 and 2A are details of a three-way valve diagrammatically indicated as valve VI in Figure 1. Figure 2 shows the valve at one position while Figure 2A shows the passageway therethrough shifted.

Referring now to Figure 1, the apparatus is shown as consisting of, in addition to other equipment, only a single reactor, namely, reactor A. Preferably, however, in order that the operation may be continuous, more than one reactor is employed so that while reactants are undergoing conversion in one or more reactors the catalytic material contained in the other or others may be undergoing reactivation. The invention is not limited to the use of any particular type reactor but may employ, for example, reactors of the type which contain a plurality of tubular elements containing the desired catalytic material with provisions for recirculating a fluid heating or cooling medium around said tubular elements for the purpose of supplying heat during the endothermic conversion reaction and withdrawing heat during the exothermic reactivation reaction. On the other hand, the reactors may comprise those of the type which are substantially completely filled with catalytic material wherein the conversion reaction is carried out under substantially adiabatic conditions and the heat formed during reactivation of the catalytic material is removed to a large extent as sensible heat in the reactivating gases. Other reactors, however, well known in the art may be employed within the broad scope of the invention. For the purpose of illustration therefor, assume that reactor A contains freshly reactivated catalyst and catalytic material in other reactors, not shown, is undergoing reactivation.

The feed, comprising any hydrocarbon oil amenable to catalytic cracking, such as, for example, a gas-oil, is supplied through line 1 and valve 2 to pump 3 which discharges through line 4 and valve 5 into heating coil 6. When desired, intermediate conversion products formed in the process may be commingled with the feed in line 4 in the manner to be described later, and the mixture thereafter supplied to heating coil 6. The oil in passing through heating coil 6 is vaporized and heated therein to a temperature ranging, for example, from 850 to 1050° F., by means of heat supplied from furnace 7. Preferably also, the time of contact of the oil in heating coil 6 is regulated so that substantially no pyrolytic cracking is effected. The heated reactants from heating coil 6 under a superatmospheric pressure ranging, for example, from substantially atmospheric to 200 pounds or more per square inch are directed through line 8 and valve 9 into reactor A wherein the heated reactants are subjected to contact with the catalytic material disposed therein.

Catalysts which have been found to be effective in the catalytic cracking of hydrocarbon vapors may comprise pellets or granules of silica or other siliceous and refractory materials composited with compounds selected from the group consisting of alumina, zirconia, vanadia, and thoria. In addition, the hydrosilicates of alumina, acid treated clays, or the like, have also been found to be effective in the cracking treatment of hydrocarbon vapors. Although the catalysts above recited are generally considered to be the preferred catalysts, their use is not to be construed as a limiting feature, for various other catalysts well known to those in the art may be employed within the broad scope of the invention.

The conversion products from reactor A are directed through line 10 and valve 11 into fractionator 12. When desired, fractionator 12 may be equipped with a separating zone wherein vaporous conversion products are substantially separated from non-vaporous liquid conversion products and the latter removed by way of line 13 and valve 14, cooled and recovered as a product of the process or subjected to any desired further treatment. Preferably also, fractionator 12 comprises a fractionator of relatively low holdup, such as, for example, a packed column, in order that rapid separation may be obtained between gasoline boiling range hydrocarbons and intermediate conversion products. Fractionator 12, on the other hand, may comprise, for example, a fractionator of the type characterized by the Podbielniak centrifugal fractionator comprising essentially a centrifugal separator operated with relatively small amounts of liquid retention within the apparatus.

The vaporous conversion products within fractionator 12 are fractionated therein to separate fractionated vapors boiling substantially in the range of gasoline from the higher boiling intermediate conversion products and the latter condensed as reflux condensate. Reflux condensate from fractionator 12 is directed through line 15 and valve 16 to pump 17. Pump 17 discharges through line 18 and the reflux condensate may be directed through line 19 and valve 20 and recovered as a product of the process or subjected to any desired further treatment. On the other hand, reflux condensate in line 18 may be directed through valve 21 into line 4 for treatment as above described.

Fractionated vapors from fractionator 12 are directed through line 22 to valve VI. In the case here illustrated, during the early stage of the processing period in reactor A fractionated vapors separated in fractionator 12 are supplied to separate condensing and collecting equipment from that to which the fractionated vapors are supplied in the later stage. The interval during which the substantially saturated product is produced will vary depending upon the type of catalyst employed in reactor A, the initial activity of the catalyst and the conditions generally, however, will ordinarily range from 50 to 30 minutes. During the interval in which the substantially saturated gasoline is produced, valve VI is adjusted to the position illustrated in Figure 2, in which case fractionated vapors supplied thereto are directed into line 23 after which they are subjected to cooling and condensation in condenser 24. Distillate, together with undissolved and uncondensed gases in condenser 25, is directed through line 25 and valve 26 into receiver 27 wherein the distillate and gases are collected and separated. During the later stages of the processing period at which time the unsaturated gasoline is formed, valve VI may be switched to the position illustrated in Figure 2A, in which case fractionated vapors supplied thereto are directed into line 28, subjected to cooling and condensation in condenser 29, and the resulting distillate and gas directed through line 30 and valve 31 into receiver 32. Undissolved and uncondensed gases collected and separated in receivers 27 and 32 may be removed by way of respective lines 33 and 35 and respective valves 34 and 36. Regulated portions of the distillate collected and separated in receivers 27 and 32 may be returned to the upper portion of fractionator 12 by well known means, not illustrated, as a refluxing and cooling medium therein. Preferably also, distillate from receiver 27 is returned to fractionator 12 only during the interval in which the condensed fractionated vapors are collected therein, while distillate from condenser 32 is supplied to fractionator 12 during the remainder of the processing period in reactor A, i. e., during the interval in which the condensed fractionated vapors are collected therein. The remaining portion of the distillate collected and separated in receiver 27 and comprising essentially a substantially saturated gasoline is removed therefrom by way of line 37 and valve 38 and may be recovered as a product of the process or, when desired, may be subjected to further fractionation, for example, to separate a relatively low boiling aviation gasoline from the higher boiling components thereof. The remaining portion of the distillate collected and separated in receiver 32 is removed therefrom by way of line 39 and valve 40 and recovered as a product of the process or subjected to any desired further treatment.

When the catalytic material within reactor A becomes spent, due to the deposition of carbonaceous materials thereon, at which time it becomes necessary to employ a fresh or freshly regenerated catalyst, the flow of reactants to reactor A may be stopped by closing valve 9 and the reactants supplied to another reactor containing fresh or freshly regenerated catalyst, not illustrated. Reactivation of the catalyst within reactor A may be accomplished by passing reactivating gases comprising, for example, combustion gases containing controlled minor amounts of oxygen at the desired temperature in contact with the catalytic material within reactor A and withdrawing the spent reactivating gases and combustion products from reactor A through line 10, line 43, and valve 44. A portion of the spent reactivating gases and combustion products withdrawn in this manner may be returned to reactor A after readjusting the temperature and oxygen content thereof as the reactivating gases while the remaining portion is disposed of or, when desired, all of the spent reactivating gases and combustion products may be supplied to some suitable heat recovery equipment and thereafter disposed of.

An example of one specific operation of the process as it may be accomplished in an apparatus such as illustrated and above described is approximately as follows:

The charge comprising a 36° A. P. I. gravity Mid-Continent gas oil is heated and vaporized at a temperature of 950° F. and the heated vapors subjected to contact with a silica-alumina catalyst at a superatmospheric pressure of 40 pounds per square inch. The conversion products throughout each process period is subjected to fractionation to separate the gasoline boiling range hydrocarbons from the intermediate conversion products and the latter recovered as a product of the process.

The fractionated vapors separated during the first 10 minutes of each process period are condensed and collected in the condenser and receiver separate from that to which the fractionated vapors separated during the latter 50 minutes of each process period are supplied. The fractionator employed in the process consists of a column packed with Raschig rings and is operated at a superatmospheric pressure of approximately 20 pounds per square inch.

From the operation as above described, approximately 8.0% of 85 octane number 8 bromine number gasoline may be obtained and approximately 32.0% of 79 octane number 80 bromine number gasoline may be obtained. Approximately 53.0% of the charge is removed as intermediate conversion products, the balance being principally gas and loss.

I claim as my invention:

1. A hydrocarbon oil conversion process which comprises providing a bed of fresh cracking catalyst and maintaining said bed at catalytic conversion temperature during a period of processing, continuously passing a stream of hydrocarbons through the catalyst bed during the processing period and converting a substantial portion of the hydrocarbons into gasoline in said bed, said stream being introduced to said bed at a substantially uniform conversion temperature throughout the processing period, whereby the activity of the catalyst is gradually diminished by deposition of carbonaceous matter thereon, producing from the hydrocarbons a substantially saturated gasoline during the initial portion of the processing period when the catalyst bed is in a state of high activity and an unsaturated gasoline during a subsequent portion of said period when the catalyst bed is in a state of diminished activity, and separately collecting said substantially saturated gasoline and said unsaturated gasoline.

2. A hydrocarbon oil conversion process which comprises providing a bed of fresh cracking catalyst and maintaining said bed at catalytic conversion temperature during a period of processing, continuously passing a stream of hydrocarbons through the catalyst bed during the processing period and converting a substantial portion of the hydrocarbons into gasoline in said bed, said stream being introduced to said bed at a substantially uniform conversion temperature throughout the processing period, whereby the activity of the catalyst is gradually diminished by deposition of carbonaceous matter thereon, producing from the hydrocarbons a substantially saturated gasoline during the initial portion of the processing period before there has been deposited on the catalyst bed a sufficient quantity of carbonaceous matter to materially impair the catalytic activity of the bed, condensing and collecting the saturated gasoline thus formed, producing from the hydrocarbons an unsaturated gasoline during a subsequent portion of the processing period when the catalyst bed has received a sufficient deposit of carbonaceous matter to substantially reduce its catalytic activity, and condensing and collecting said unsaturated gasoline independently of said saturated gasoline.

KENNETH M. WATSON.